(12) United States Patent
Sato et al.

(10) Patent No.: US 10,668,877 B2
(45) Date of Patent: Jun. 2, 2020

(54) SWITCH DEVICE FOR ON-BOARD POWER SUPPLY AND ON-BOARD POWER SUPPLY SYSTEM

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Shinichiro Sato, Yokkaichi (JP); Hiromichi Yasunori, Yokkaichi (JP)

(73) Assignees: AUTONETWORKS TECHNOLGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 36 days.

(21) Appl. No.: 16/095,560

(22) PCT Filed: Apr. 12, 2017

(86) PCT No.: PCT/JP2017/014957
§ 371 (c)(1),
(2) Date: Oct. 22, 2018

(87) PCT Pub. No.: WO2017/187984
PCT Pub. Date: Nov. 2, 2017

(65) Prior Publication Data
US 2019/0126866 A1 May 2, 2019

(30) Foreign Application Priority Data
Apr. 25, 2016 (JP) .................. 2016-086919

(51) Int. Cl.
*B60R 16/033* (2006.01)
*H02J 7/00* (2006.01)
(Continued)

(52) U.S. Cl.
CPC ............ *B60R 16/033* (2013.01); *B60R 16/02* (2013.01); *B60R 16/03* (2013.01); *H02J 1/08* (2013.01); *H02J 7/00* (2013.01); *H02J 7/0063* (2013.01)

(58) Field of Classification Search
CPC ....... B60R 16/033; B60R 16/02; B60R 16/03; H02J 1/08; H02J 7/00; H02J 7/0063
See application file for complete search history.

(56) References Cited

U.S. PATENT DOCUMENTS 10,179,519 B2 * 1/2019 Schmidt .................. B60L 58/18
2017/0080883 A1 3/2017 Yasunori et al.
(Continued)

FOREIGN PATENT DOCUMENTS

JP H9-233694 A 9/1997
JP 2015-83404 A 4/2015
(Continued)

OTHER PUBLICATIONS

Jun. 13, 2017 International Search Report issued in International Patent Application No. PCT/JP2017/014957.

*Primary Examiner* — Jared Fureman
*Assistant Examiner* — Duc M Pham
(74) *Attorney, Agent, or Firm* — Oliff PLC

(57) ABSTRACT

A switch device that includes a first input terminal that is connected to a first battery; a second input terminal that is connected to a second battery; a first output terminal that is connected to a first load; a second output terminal and a third output terminal that are both connected to a second load; a first conductive path that is connected to the first input (Continued)

terminal; a first switch that includes one terminal that is connected to the first input terminal via the first conductive path, and further includes another terminal; a second conductive path that is connected to the second input terminal; and a second switch that includes one terminal that is connected to the second input terminal via the second conductive path, and further includes another terminal.

6 Claims, 11 Drawing Sheets

(51) Int. Cl.
  B60R 16/02 (2006.01)
  B60R 16/03 (2006.01)
  H02J 1/08 (2006.01)

(56) References Cited

U.S. PATENT DOCUMENTS

2017/0225635 A1* 8/2017 Obayashi ......... G01R 19/16533
2018/0262044 A1* 9/2018 Schipperges .......... H02J 7/1461

FOREIGN PATENT DOCUMENTS

| JP | 2015-168292 A | * | 9/2015 | ........... B60R 16/033 |
| JP | 2015-217734 A | | 12/2015 | |
| JP | 2016-107879 A | | 6/2016 | |

* cited by examiner

SWITCH DEVICE FOR ON-BOARD POWER SUPPLY AND ON-BOARD POWER SUPPLY SYSTEM

This application is the U.S. National Phase of PCT/JP2017/014957 filed Apr. 12, 2017, which claims priority to JP 2016-086919 filed Apr. 25, 2016, the entire disclosure of which is incorporated herein by reference.

BACKGROUND

The present disclosure relates to a switch device for an on-board power supply, and an on-board power supply system.

JP 2015-83404A discloses an on-board power supply device. This on-board power supply device includes a main battery, a sub-battery, first to third switches, a first auxiliary device group, and a second auxiliary device group. The first to third switches are connected to each other in series in this order between the main battery and the sub-battery. The first auxiliary device group is connected to a point between the first switch and the second switch via a first wire. Accordingly, when the first switch is turned on, the first auxiliary device group receives a supply of power from the main battery. Also, when the second switch and the third switch are turned on, the first auxiliary device group also receives a supply of power from the sub-battery. The first auxiliary device group may be, for example, an audio system, a safety device, a car navigation system, or an ECU for controlling idling stop.

The second auxiliary device group is connected directly to the main battery via a second wire, and is connected to a point between the second switch and the third switch via a third wire. Accordingly, the second auxiliary device group receives a supply of power directly from the main battery, and also receives a supply of power from the sub-battery when the third switch is turned on. The second auxiliary device group may be an electronically-controlled brake system, a vehicle wireless communication system, or the like.

Also, a technique related to the present disclosure is disclosed in JP 119-233694A.

SUMMARY

In JP 2015-83404A, if the second auxiliary device group is a high current load, in order to cope with this, it is necessary to use wires that have a high current capacity as the second wire and the third wire. Accordingly, the second wire and the third wire are thick, and it is therefore difficult to route these wires.

An exemplary aspect of the disclosure provides a switch device for an on-board power supply that contributes to making the routing of wires easier.

A switch device for an on-board power supply according to a first aspect includes a first input terminal that is connected to a first battery; a second input terminal that is connected to a second battery; a first output terminal that is connected to a first load; a second output terminal and a third output terminal that are both connected to a second load; a first conductive path that is connected to the first input terminal; a first switch that includes one terminal that is connected to the first input terminal via the first conductive path, and further includes another terminal; a second conductive path that is connected to the second input terminal; a second switch that includes one terminal that is connected to the second input terminal via the second conductive path, and further includes another terminal; a third conductive path that connects the other terminal of the first switch, the other terminal of the second switch, and the first output terminal to each other; a fourth conductive path that connects the first conductive path and the second output terminal, and has a current capacity that is smaller than a current capacity of the third conductive path; and a fifth conductive path that connects the second conductive path and the third output terminal, and has a current capacity that is smaller than the current capacity of the third conductive path.

A switch device for an on-board power supply according to a second aspect where a lead battery is connected to the first input terminal as the first battery, a lithium ion battery or a nickel-metal hydrid battery is connected to the second input terminal as the battery, the first switch and the second switch are controlled by a control circuit, and the control circuit turns off the second switch, and thereafter turns off the first switch if it is determined that a ground fault has occurred on a first output terminal side with respect to the first switch and the second switch while the first switch and the second switch are on.

A switch device for an on-board power supply according to a third aspect where the first switch and the second switch are controlled by a control circuit, and the control circuit turns off the second switch, and thereafter turns on the first switch if it is determined that a ground fault has occurred on a second battery side or a third output terminal side with respect to the second switch while the first switch is off, and the second switch is on.

A switch device for an on-board power supply according to a fourth aspect where the second battery is connected to the second input terminal via a battery unit, the battery unit performs switching between a conductive state and a non-conductive state between the second battery and the second input terminal, the first switch, the second switch, and the battery unit are controlled by a control circuit, and the control circuit makes the battery unit non-conductive, and thereafter turns on the first switch if it is determined that a ground fault has occurred on a second battery side with respect to the battery unit while the first switch is off, the second switch is on, and the battery unit is conductive.

A switch device for an on-board power supply according to a fifth aspect where the second battery is connected to the second input terminal via a battery unit, the battery unit performs switching between a conductive state and a non-conductive state between the second battery and the second input terminal, the first switch, the second switch, and the battery unit are controlled by a control circuit, and the control circuit turns on the first switch and turns off the second switch, and thereafter makes the battery unit non-conductive if it is determined that a ground fault has occurred on a second switch side or a third output terminal side with respect to the battery unit.

A switch device for an on-board power supply according to a sixth aspect further includes the control circuit.

An on-board power supply system according to one aspect is an on-board power supply system that is mounted on a vehicle, the on-board power supply system including: a first switch and a second switch; a first wire that connects one terminal of the first switch and a first battery; a second wire that connects one terminal of the second switch and a second battery; a third wire that connects another terminal of the first switch, another terminal of the second switch, and a first load to each other; a fourth wire that connects the first wire and a second load that has a rated current that is smaller than a rated current of the first load, the fourth wire having a current capacity that is smaller than a current capacity of the third wire; and a fifth wire that connects the second wire and the second load, and has a current capacity that is smaller than the current capacity of the third wire.

With the switch device for an on-board power supply according to the first aspect, by connecting the first battery to the first input terminal and the second battery to the second input terminal, and also connecting the first load to the first output terminal, it is possible to provide a redundant power supply to the first load. Also, by connecting the second load to the second and third output terminals, it is possible to provide a redundant power supply to the second load.

Also, the switch device according to the first aspect is suitable for a configuration in which the second load has a rated current that is smaller than the rated current of the first load. This is because the fourth conductive path and the fifth conductive path that are connected to the second load have a current capacity that is smaller than the current capacity of the third conductive path that is connected to the first load.

Also, with this configuration, the current capacities of a power supply line that connects the second output terminal and the second load and a power supply line that connects the third output terminal and the second load can be set to be smaller than the current capacity of a power supply line that connects the first output terminal and the first load. Because power supply lines that have a small current capacity are thin, the power supply lines can be easily routed.

With the switch devices for an on-board power supplies according to the second and sixth aspects, it is possible to suppress degradation of the lithium ion battery or the nickel-metal hydrid battery that is expensive.

With the switch devices for an on-board power supply according to the third and sixth aspects, it is possible to supply electric current from the first battery to the outside via the first output terminal and the second output terminal without causing a ground fault current.

With the switch devices for an on-board power supply according to the fourth and sixth aspects, it is possible to supply electric current from the first battery to the outside via the first output terminal and the second output terminal without causing a ground fault current.

With the switch devices for an on-board power supply according to the fifth and sixth aspects, the battery unit is made non-conductive after the first switch and the second switch have been controlled. The non-conductive state of the battery unit does not contribute to the power supply from the second battery. For this reason, the battery unit is made non-conductive after other elements have been controlled. In other words, power can be supplied from the first battery more rapidly than a configuration in which the battery unit is made non-conductive before the first switch and the second switch are controlled.

With the on-board power supply system according to one aspect, because the current capacities of the fourth wire and the fifth wire are small, the fourth wire and the fifth wire are thin. Accordingly, it is easy to route wires.

DETAILED DESCRIPTION OF EMBODIMENTS

Figure 1:
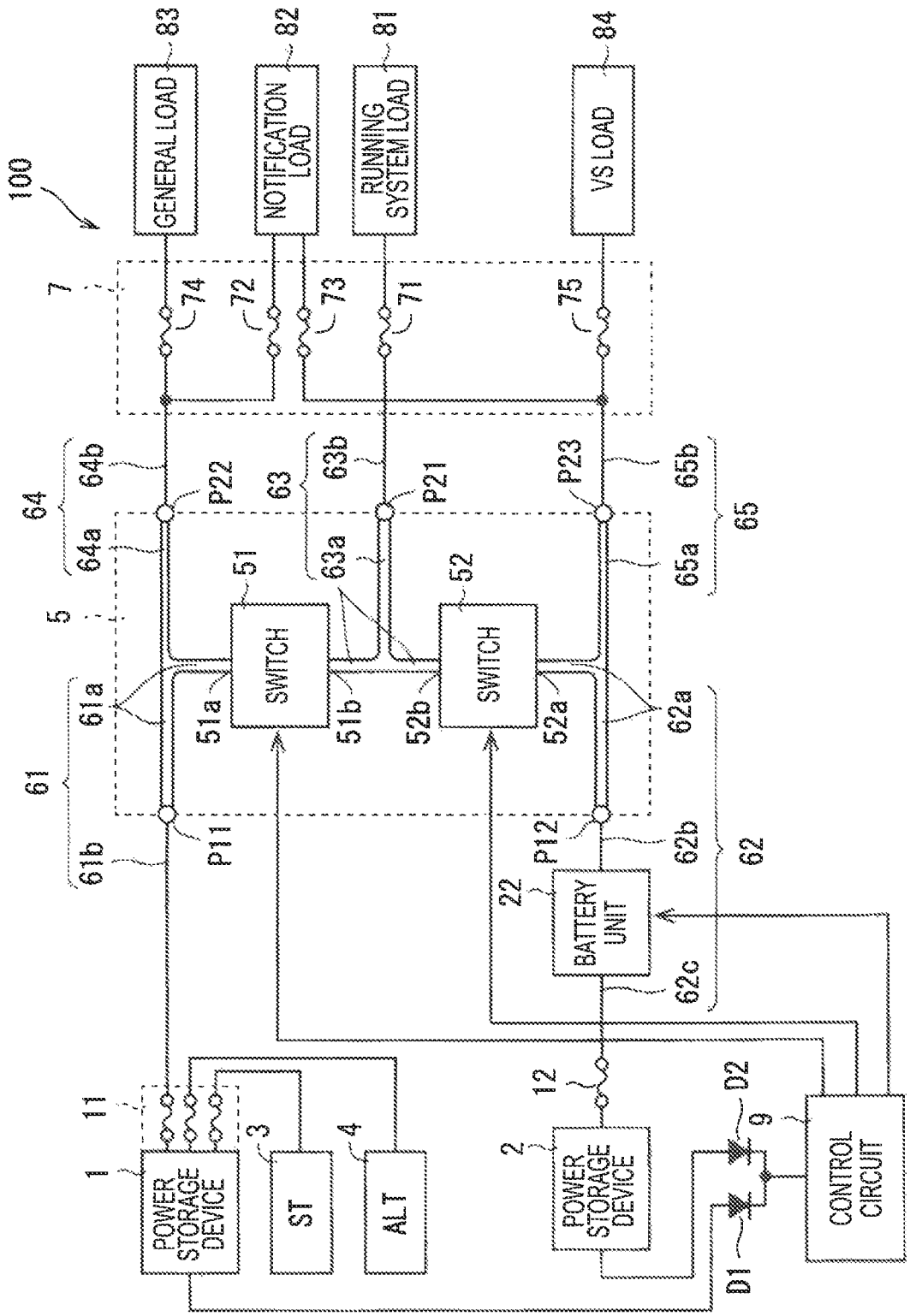
FIG. 1 is a diagram schematically showing an example of an on-board power supply system.

FIG. 1 is a diagram schematically showing an example of a configuration of an on-board power supply system 100. The on-board power supply system 100 is mounted on a vehicle. The on-board power supply system 100 includes at least a switch device 5 for an on-board power supply, power storage devices 1 and 2, and loads 81 and 82. As shown in FIG. 1, the on-board power supply system 100 may further include a battery unit 22, a starter 3, an electric generator 4, a fuse box 7, a fuse group 11, a fuse 12, loads 83 and 84, a control circuit 9, and diodes D1 and D2.

The switch device 5 is a device that is provided between (i) the power storage devices 1 and 2 and (ii) the loads 81 to 84, and that switches the electric connection relationship thereof. The switch device 5 includes switches 51 and 52, input terminals P11 and P12, output terminals P21 to P23, and conductive paths 61a to 65a.

The switches 51 and 52 are, for example, relays, and closing and opening the relays correspond to turning the switches 51 and 52 on and off. If the switches 51 and 52 are composed of relays, the switch device 5 can be regarded as a relay module. The control circuit 9 controls the switches 51 and 52 between on and off.

The conductive paths 61a to 65a are paths through which electric current flows, and are made of, for example, metal. The conductive paths 61a to 65a may be formed as, for example, a metal pattern on a predetermined substrate, or a metal plate that is also called "bus bar".

The conductive path 61a connects the input terminal P11 and one terminal 51a of the switch 51. The conductive path 62a connects the input terminal P12 and one terminal 52a of the switch 52. The conductive path 63a connects another terminal 51b of the switch 51, another terminal 52b of the switch 52, and the output terminal P21 to each other. The conductive path 64a is branched from the conductive path 61a, and connected to the output terminal P22. That is, the conductive path 64a is a conductive path that connects the conductive path 61a and the output terminal P22. The conductive path 65a is branched from the conductive path 62a, and connected to the output terminal P23. That is, the conductive path 65a is a conductive path that connects the conductive path 62a and the output terminal P23.

The input terminal P11 is connected to the power storage device 1 via a power supply line 61b. Accordingly, a wire 61 that includes the conductive path 61a and the power supply line 61b connects the power storage device 1 and the one terminal 51a of the switch 51. The power supply line 61b may be an electric wire for example, and may be part of a wire harness. Power supply lines 62b, 62c, and 63b to 65b, which will be described later, are also electric wires, and are included in a wire harness. In the example shown in FIG. 1, the power supply line 61b is connected to the power storage device 1 via a first fuse of the fuse group 11. For example, the fuse group 11 may be implemented by a battery fuse terminal (BFT).

The input terminal P12 is connected to the power storage device 2 via power supply lines (the power supply lines 62b and 62c shown in FIG. 1). Accordingly, a wire 62 that includes the conductive path 62a and the power supply lines 62b and 62c connects the power storage device 2 and the one terminal 52a of the switch 52. In the example shown in FIG. 1, the power supply line 62b connects the input terminal P12 and the battery unit 22. One end of the power supply line 62c is connected to the battery unit 22, and another end is connected to the power storage device 2 via the fuse 12. The fuse 12 may be implemented by, for example, a battery fuse terminal.

The battery unit 22 can select a conductive state or a non-conductive state between the power supply lines 62b and 62c. The battery unit 22 may be, for example, a switch (for example, a relay), or may be a bidirectional DC/DC converter. The DC/DC converter can convert a direct current voltage input from the power supply line 62b to a direct current voltage suitable for the power storage device 2 and output the direct current voltage suitable for the power storage device 2 to the power supply line 62c. The power storage device 2 can be thereby charged. Also, the DC/DC converter can convert a direct current voltage input from the power supply line 62c to a desired direct current voltage, and output the desired direct current voltage to the power supply line 62b. It is thereby possible to output the voltage from the power storage device 2 to the switch device 5. The battery unit 22 is controlled by, for example, the control circuit 9.

The power storage device 1 may be, for example, a lead battery. In the example shown in FIG. 1, the starter 3 is connected to the power storage device 1 via a second fuse of the fuse group 11. The starter 3 includes a motor for starting an engine. In FIG. 1, the starter 3 is labeled "ST".

The electric generator 4 may be, for example, an alternator, and generates electricity by rotation of the engine of the vehicle, and outputs a direct current voltage. In the example shown in FIG. 1, the electric generator 4 is labeled "ALT". The electric generator 4 may be a SSG (Side mounted Starter Generator). The electric generator 4 is connected to the power storage device 1 via a third fuse of the fuse group 11. The electric generator 4 can charge the power storage device 1. The electric generator 4 can also charge the power storage device 2 while the switches 51 and 52 are on, and the battery unit 22 is conductive. The power storage device 2 may be, for example, a lithium ion battery, a nickel-metal hybrid battery, or a capacitor.

The output terminal P21 is connected to a load 81 via the power supply line 63b. Accordingly, a wire 63 that includes the conductive path 63a and the power supply line 63b connects the other terminal 51a of the switch 51, the other terminal 52b of the switch 52, and the load 81 to each other. In the example shown in FIG. 1, the wire 63 is connected to the load 81 via a fuse 71 that belongs to the fuse box 7.

The output terminal P22 is connected to a load 82 via a power supply line 64b. Accordingly, a wire 64 that includes the conductive path 64a and the power supply line 64b can be explained as a wire that is branched from the wire 61 and connected to the load 82. That is, the wire 64 connects the wire 61 and the load 82. In the example shown in FIG. 1, the wire 64 is connected to the load 82 via a fuse 72 that belongs to the fuse box 7.

The output terminal P23 is connected to the load 82 via a power supply line 65b. Accordingly, a wire 65 that includes the conductive path 65a and the power supply line 65b can be explained as a wire that is branched from the wire 62, and connected to the load 82. That is, the wire 65 connects the wire 62 and the load 82. In the example shown in FIG. 1, the wire 65 is connected to the load 82 via a fuse 73 that belongs to the fuse box 7.

With the on-board power supply system 100 as described above, a redundant power supply is provided to the loads 81 and 82. For example, even if the power storage device 1 is deactivated, by making the battery unit 22 conductive and turning on the switch 52, the power storage device 2 can supply power to the load 81. On the other hand, even if the power storage device 2 is deactivated, by turning on the switch 51, the power storage device 1 can supply power to the load 81. That is, even if one of the power storage devices 1 and 2 is deactivated, the other power storage device can supply power to the load 81. As used herein, the deactivation of the power storage device 1 encompasses a malfunction of the power storage device 1, and a malfunction (for example, a ground fault) of the wires 61 and 64. Likewise, the deactivation of the power storage device 2 encompasses a malfunction of the power storage device 2, and a malfunction (for example, a ground fault) of the wires 62 and 65.

Also, even if the power storage device 1 is deactivated, by making the battery unit 22 conductive, the power storage device 2 can supply power to the load 82. Alternatively, even if the power storage device 2 is deactivated, the power storage device 1 can supply power to the load 82. That is, even if one of the power storage devices 1 and 2 is deactivated, the other power storage device can supply power to the load 82.

As described above, a redundant power supply is provided to the loads 81 and 82. However, with respect to the load 82, two wires 64 and 65 are connected to the load 82, and a redundant power supply is provided to the load 82, whereas with respect to the load 81, one wire 63 is connected to the load 81, and a redundant power supply is provided to the load 81.

The load 81 is a load through which a relatively large current flows, and may be, for example an actuator. In the example shown in FIG. 1, the load 81 is labeled "Running system load", and may be, for example, a running system actuator (for example, an electric motor for steering or braking). An electric current of, for example, several dozen amperes [A] (for example, about 50 [A] to 100[A]) flows through the load 81.

The load 82 is a load through which an electric current that is smaller than the electric current that flows through the load 81. For example, the load 82 has a rated current that is smaller than the rated current of the load 81. In the example shown in FIG. 1, the load 82 is labeled "Notification load", and may be, for example, a sensor or a notification display panel. The display panel includes various types of light emitting elements (for example, light emitting diodes), or meters that display various types of parameters such as speed. An electric current of, for example, several amperes [A] (for example, about 5 [A]) flows through the load 82.

As described above, because the electric current that flows through the load 82 is smaller than the electric current that flows through the load 81, in the on-board power supply system 100 of the present embodiment, the current capacities of the wires 64 and 65 are set to be smaller than the current capacity of the wire 63. That is, wires that have current capacities that are smaller than the current capacity of the wire 63 are used as the wires 64 and 65. For example, the current capacities of the power supply lines 64*b* and 65*b* are set to be smaller than the current capacity of the power supply line 63*b*. Likewise, the current capacities of the conductive paths 64*a* and 65*a* are set to be smaller than the current capacity of the conductive path 63*a*. In the example shown in FIG. 1, the current capacities of the conductive paths are schematically shown by the wire widths of the conductive paths.

A wire that has a large current capacity is thick. Accordingly, the power supply line 63*b* is thicker than the power supply lines 64*b* and 65*b*. That is, in the on-board power supply system 100 of the present embodiment, the load 81 through which a large electric current flows receives power from one thick wire 63. On the other hand, the load 82 through which a small electric current flows receives power from two thin wires 64 and 65.

For comparison with the present embodiment, a configuration will be considered in which the magnitude relationship between the electric current that flows through the load 81 and the electric current that flows through the load 82 is reversed. In this case, the current capacities of the wires 64 and 65 are set to be larger than the current capacity of the wire 63. Accordingly, the wires 64 and 65 are thicker than the wire 63. That is, one thin wire 63 and two thick wires 64 and 65 are provided. Wire routing becomes more difficult as the number of thick wires increases as in this case.

On the other hand, in the on-board power supply system 100 of the present embodiment, as described above, it is sufficient that two thin wires 64 and 65, and one thick wire 63 are provided. That is, the number of thick wires can be reduced. Accordingly, it is easy to perform wire routing.

Also, in the switch device 5, the current capacities of the conductive paths 64*a* and 65*a* are smaller than the current capacity of the conductive path 63*a*. The switch device 5 as described above is suitable for the loads 81 and 82 described above compared to the configuration in which the magnitude relationship of the current capacity is reversed. Also, because a conductive path that has a small current capacity is thin, the size of the switch device 5 can be made smaller than that of the configuration in which the magnitude relationship of the current capacity is reversed.

The conductive paths 61*a* and 62*a* also function as a portion of an electric current path extending to the load 81 through which a large electric current flows, and it is therefore desirable that the conductive paths 61*a* and 62*a* have a large current capacity (for example, a current capacity that is greater than or equal to the current capacity of the conductive path 63*a*).

In the example shown in FIG. 1, the load 84 is connected to the output terminal P23 via a fuse 75 that belongs to the fuse box 7. The load 84 may be, for example, a load through which an electric current that is smaller than the electric current that flows through the load 81. Also, the load 84 may be a VS (Voltage Stabilized) load that requires a stable voltage. As used herein, the term "stable voltage" refers to a voltage that is unlikely to be below the lower limit value of the voltage required by the load 84. In this case, a bidirectional DC-DC converter is used as the battery unit 22. The DC/DC converter supplies a voltage that is greater than the lower limit value to the load 84 in a stable manner. The load 84 may be, for example, a car navigation system or an audio system.

Also, in the example shown in FIG. 1, the load 83 is connected to the output terminal P22 via a fuse 74 that belongs to the fuse box 7. The load 83 may be, for example, a load through which an electric current that is smaller than the electric current that flows through the load 81. The load 81 may be, for example, a room lamp that illuminates the interior of the vehicle.

Control Circuit

The control circuit 9 controls the switches 51 and 52, and the battery unit 22. The control circuit 9 may be, for example, an ECU (Electrical Control Unit), or may be a BCM (Body Control Module) that performs overall control on the vehicle.

Also, in this example, the control circuit 9 includes a microcomputer and a storage device. The microcomputer executes processing steps (or in other words, a procedure) written in a program. The storage device may include, for example, one or more of various types of storage devices such as a ROM (Read Only Memory), a RAM (Random Access Memory), a rewriteable nonvolatile memory (EPROM (Erasable Programmable ROM), and the like), and a hard disk device. The storage device stores various types of information, data, and the like. The storage device also stores a program that is executed by the microcomputer, and provides a work area for the program to be executed. The microcomputer can be regarded as functioning as various types of means that correspond to the processing steps written in the program, or can be regarded as implementing various types of functions that correspond to the processing steps. Also, the control circuit 9 is not limited thereto. Some or all of various types of procedures that are executed by the control circuit 9, or various types of means or various types of functions that are implemented by the control circuit 9 may be implemented by a hardware circuit. The same applies to other control circuits, which will be described later.

In the example shown in FIG. 1, the control circuit 9 is connected to the power storage devices 1 and 2 via the diodes D1 and D2. The forward direction of the diode D1 is a direction in which an electric current flows from the power storage device 1 to the control circuit 9, and the forward direction of the diode D2 is a direction in which an electric current flows from the power storage device 2 to the control circuit 9. The cathodes of the diodes D1 and D2 are commonly connected to the control circuit 9. It is therefore possible to suppress the electric current from flowing into the power storage devices 1 and 2. The control circuit 9 receives power from the power storage devices 1 and 2, and performs operation Control During Normal Operation For example, the control circuit 9 controls the switches 51 and 52, and the battery unit 22 in the following manner according to the running state of the vehicle. The table given below shows examples of switch control patterns that are used while the vehicle is running.

TABLE 1

| Control pattern | Switch 51 | Switch 52 | Battery unit 22 |
| --- | --- | --- | --- |
| A | ON | ON | ON |
| B | OFF | ON | ON |

For example, the control circuit 9 uses the control pattern A when the power storage device 2 is charged (for example, during regenerative operation of the vehicle). That is, the control circuit 9 turns on both the switches 51 and 52 when the power storage device 2 is charged.

Also, if the power storage device 2 is a lithium ion battery, a nickel-metal hydrid battery, or a capacitor, the charge acceptance of the power storage device 2 is higher than a lead battery. Accordingly, in order to perform an efficient operation, it is desirable to increase the frequency of use of the power storage device 2. Accordingly, the control circuit 9 may use the control pattern B when the power storage device 2 is not charged (for example, during power running operation of the vehicle).

In the Event of Anomaly

Figure 2:
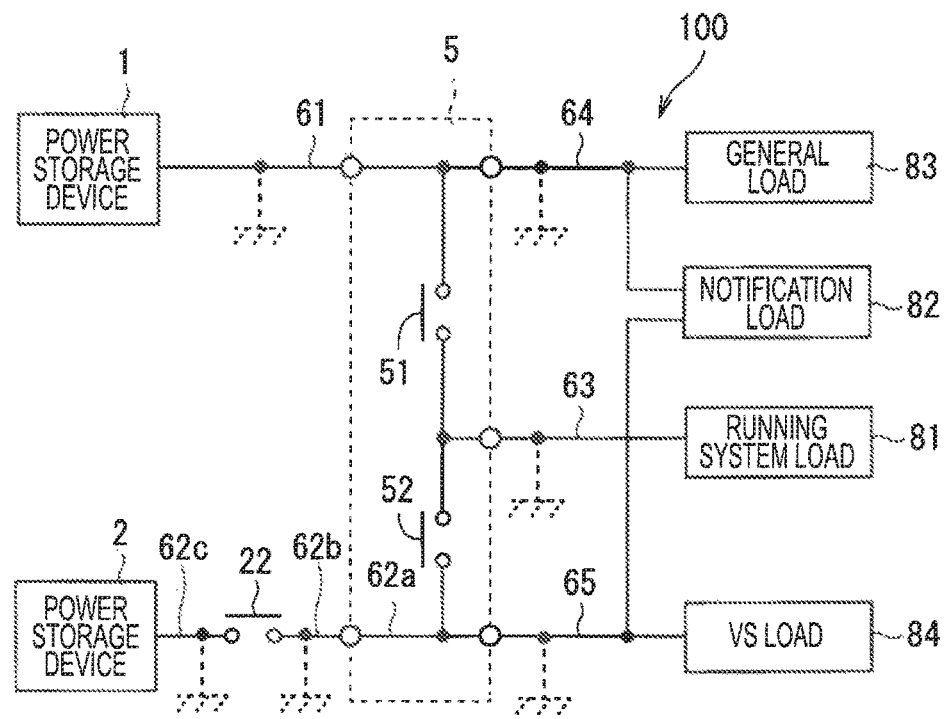
FIG. 2 is a diagram schematically showing examples of ground faults.

A ground fault may occur in the wires 61 to 65. FIG. 2 is a diagram schematically showing ground faults that may occur in the wires 61 to 65. In the example shown in FIG. 2, ground faults are indicated by ground symbols. Also, in the example shown in FIG. 2, for the sake of simplification of the diagram, the illustration of the starter 3, the electric generator 4, the fuse box 7, the control circuit 9, the fuse group 11 and the fuse 12 is omitted. Also, the battery unit 22 is equivalently expressed as a switch. For simplification, each conductive path is also shown as a single line. The same applies to the drawings that will be referred to hereinafter.

If a ground fault occurs in a wire, the voltage applied to the wire drops, and the electric current that flows through the wire increases. Accordingly, a detection portion that detects at least one of the voltage and the electric current of each wire is provided, and the detection value is given to the control circuit 9. With this configuration, the control circuit 9 can determine the occurrence of a ground fault based on the voltage or the electric current of each wire. As described above, the detection portion that detects a ground fault is a known technique, and thus a detailed description and illustration thereof are omitted here.

Figure 3:
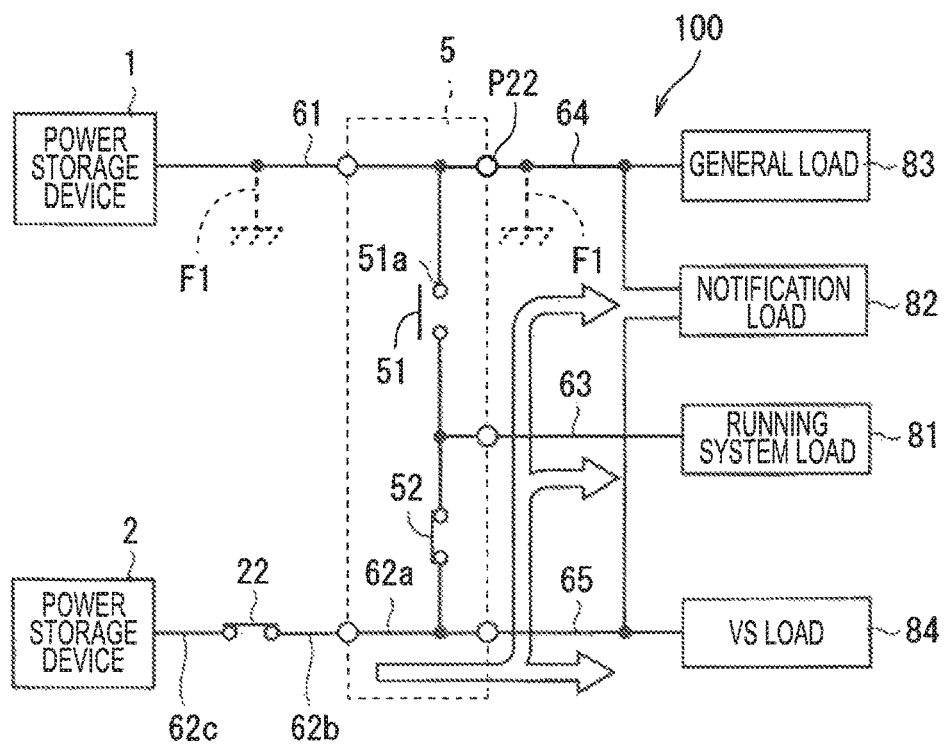
FIG. 3 is a diagram schematically showing an example of the on-board power supply system when a ground fault has occurred.

FIG. 3 is a diagram showing an example of a configuration of the on-board power supply system 100 when a ground fault F1 has occurred in any one of the wire 61 and the wire 64. The ground fault F1 can be explained as follows. That is, the ground fault F1 is a ground fault that occurs on the power storage device 1 side or on the output terminal P22 side (or the load 83 side) with respect to the one terminal 51a of the switch 51. To be specific, with reference to FIG. 1, the ground fault F1 is a ground fault that occurs in any one of the power supply lines 61b and 64b, and the conductive paths 61a and 64a.

If a ground fault F1 occurs in the wire 61 or the wire 64, a large electric current (hereinafter also referred to as "ground fault current") flows from the power storage device 1 to the ground fault F1. In this case, the power storage device 1 cannot appropriately supply power to any of the loads 81 to 84. At this time, if both the switches 51 and 52 are on, and the battery unit 22 is conductive, a ground fault current also flows from the power storage device 2 to the ground fault F1. In this case, the power storage device 2 as well cannot appropriately supply power to any of the loads 81 to 84.

Accordingly, if it is determined that a ground fault F1 has occurred in the wire 61 or the wire 64, the control circuit 9 turns off the switch 51, turns on the switch 52, and makes the battery unit 22 conductive. The power storage device 2 is thereby disconnected from the ground fault F1, and can supply power to the load 81 that is a running system load that is highly required to ensure power supply. At this time, power is also supplied to the loads 82 and 84. In the example shown in FIG. 3, the power supply paths are indicated by block arrows.

Figure 4:
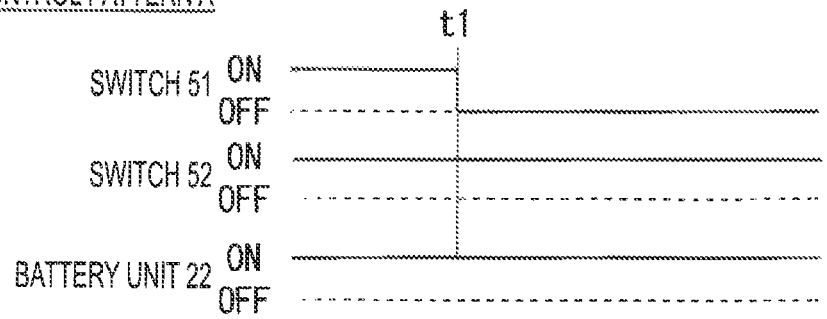
FIG. 4 is a diagram schematically showing an example of a timing chart.
Figure 5:
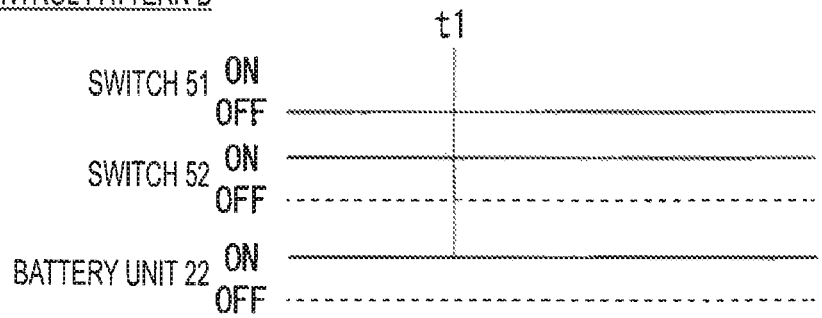
FIG. 5 is a diagram schematically showing an example of a timing chart.

FIGS. 4 and 5 show examples of timing charts when a ground fault F1 has occurred in the wire 61 or the wire 64. In FIG. 4, the control pattern A is initially used. That is, at the initial stage, both the switches 51 and 52 are turned on, and the battery unit 22 is conductive. At time t1, in response to the occurrence of a ground fault F1 in the wire 61 or the wire 64, the control circuit 9 turns off the switch 51. The power storage device 2 can thereby appropriately supply power to the loads 81, 82, and 84.

In FIG. 5, the control pattern B is initially used. That is, at the initial stage, the switch 51 is turned off, the switch 52 is turned on, and the battery unit 22 is conductive. The control pattern B is the same as the pattern used in response to the occurrence of a ground fault F1 in the wire 61 or the wire 64. Accordingly, if it is determined that a ground fault F1 has occurred, the control circuit 9 maintains the switching states of the switches 51 and 52, and maintains the conductive state of the battery unit 22.

Figure 6:
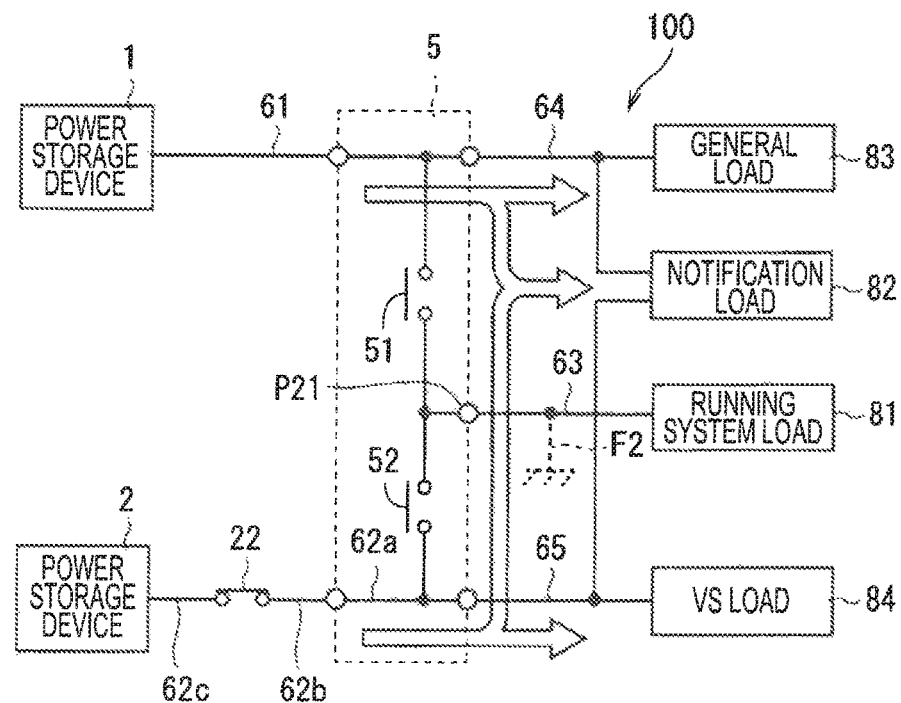
FIG. 6 is a diagram schematically showing an example of the on-board power supply system when a ground fault has occurred.

FIG. 6 is a diagram schematically showing an example of the on-board power supply system 100 when a ground fault F2 has occurred in the wire 63. The ground fault F2 can be explained as follows. That is, the ground fault F2 is a ground fault that occurs on the output terminal P21 side (or the load 81 side) with respect to the switches 51 and 52. To be specific, with reference to FIG. 1, the ground fault F2 is a ground fault that occurs in the power supply line 63b or the conductive path 63a.

In a state in which a ground fault F2 has occurred in the wire 63, when the switch 51 is on, a ground fault current flows from the power storage device 1 to the ground fault F2. Accordingly, the power storage device 1 cannot appropriately supply power to the load 81. Likewise, when the switch 52 is on, and the battery unit 22 is conductive, a ground fault current flows from the power storage device 2 to the ground fault F2. Accordingly, the power storage device 2 cannot appropriately supply power to the load 81.

Accordingly, if it is determined that a ground fault F2 has occurred in the wire 63, the control circuit 9 turns off both the switches 51 and 52, and makes the battery unit 22 conductive. The power storage device 1 is thereby disconnected from the ground fault F2, and can supply power to the loads 82 and 83, and the power storage device 2 is disconnected from the ground fault F2, and can supply power to the loads 82 and 84. In the example shown in FIG. 6, the supply paths are indicated by block arrows.

Figure 7:
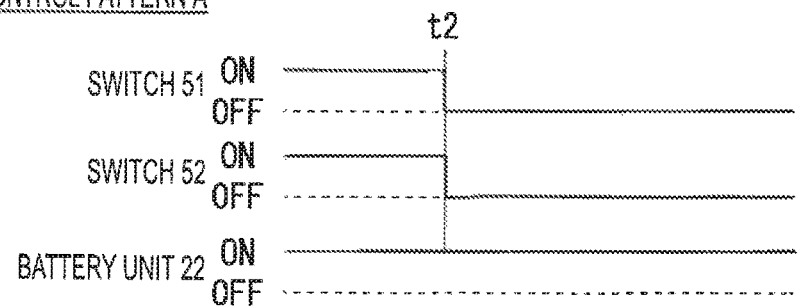
FIG. 7 is a diagram schematically showing an example of a timing chart.
Figure 8:
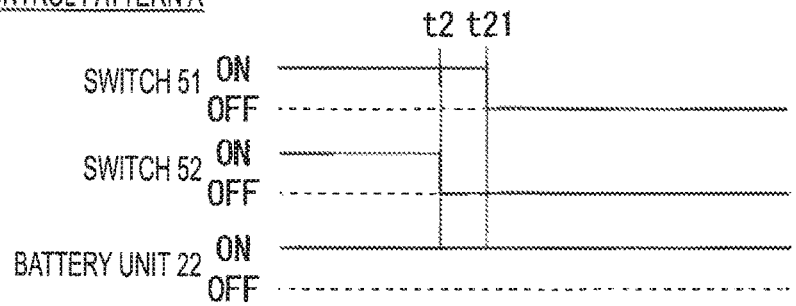
FIG. 8 is a diagram schematically showing an example of a timing chart.
Figure 9:
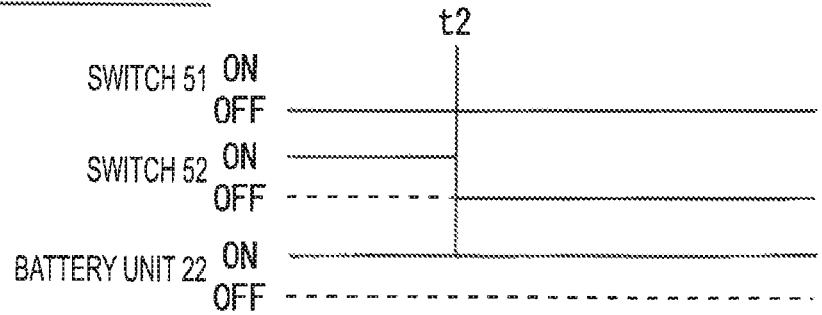
FIG. 9 is a diagram schematically showing an example of a timing chart.

FIGS. 7 to 9 show examples of timing charts when a ground fault F2 has occurred in the wire 63. In FIG. 7, the control pattern A is initially used. In the timing chart shown in FIG. 7, at time t2, in response to the occurrence of a ground fault F2 in the wire 63, the control circuit 9 turns off both the switches 51 and 52. The power storage devices 1 and 2 can thereby appropriately supply power to the load 82 to 84.

However, to be strict, it is difficult for the control circuit 9 to simultaneously turn off the switches 51 and 52. For this reason, turning off the switch 51 and turning off the switch 52 may be performed in a predetermined order. The predetermined order may be set arbitrarily. However, for example, as shown in the timing chart in FIG. 8, at time t2, the control circuit 9 may turn off the switch 52, and thereafter turn off the switch 51 at time t21. In this way, the ground fault current from the power storage device 2 can be preferentially blocked. Accordingly, compared to the case where the order of control of the switches 51 and 52 is reversed, degradation of the power storage device 2 can be suppressed. This is particularly effective when the power storage device 2 is a lithium ion battery or a nickel-metal hydrid battery, because the lithium ion battery or the nickel-metal hydrid battery is expensive.

In FIG. 9, the control pattern B is initially used. At time t2, in response to the occurrence of a ground fault F2 in the wire 63, the control circuit 9 turns off the switch 52. The power storage devices 1 and 2 can thereby appropriately supply power to the load 82 to 84.

Figure 10:
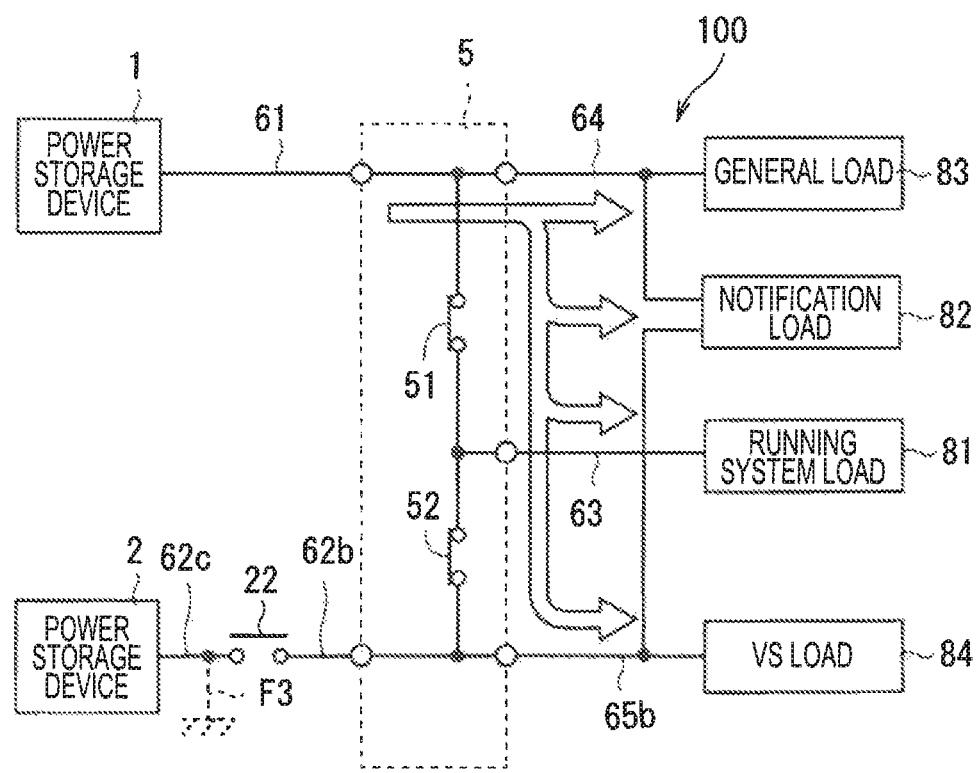
FIG. 10 is a diagram schematically showing an example of the on-board power supply system when a ground fault has occurred.

FIG. 10 is a diagram schematically showing an example of the on-board power supply system 100 when a ground fault F3 has occurred in the power supply line 62c. The ground fault F3 can be explained as follows. That is, the ground fault F3 is a ground fault that occurs between the power storage device 2 and the battery unit 22.

If a ground fault F3 occurs in the power supply line 62c, a ground fault current flows from the power storage device 2 to the ground fault F3. Accordingly, the power storage device 2 cannot appropriately supply power to the loads 81 to 84. At this time, when both the switches 51 and 52 are on, and the battery unit 22 is conductive, a ground fault current also flows from the power storage device 1 to the ground fault F3. In this case, the power storage device 1 as well cannot appropriately supply power to the loads 81 to 84.

Accordingly, if it is determined that a ground fault F3 has occurred in the power supply line 62c, the control circuit 9 turns on both the switches 51 and 52, and makes the battery unit 22 non-conductive. The power storage device 1 can thereby supply power to the loads 81 to 84. In the example shown in FIG. 10, the power supply paths are indicated by block arrows.

Figure 11:
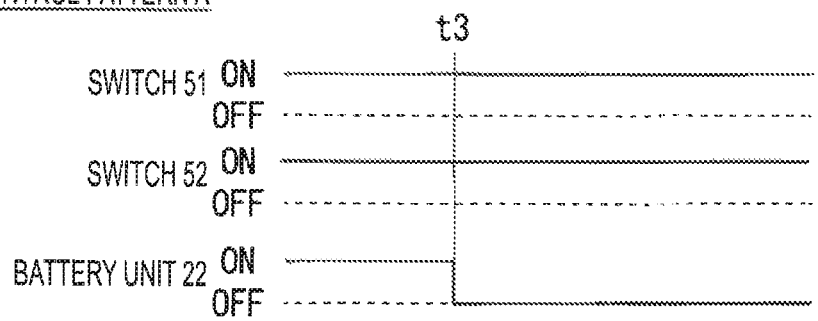
FIG. 11 is a diagram schematically showing an example of a timing chart.
Figure 12:
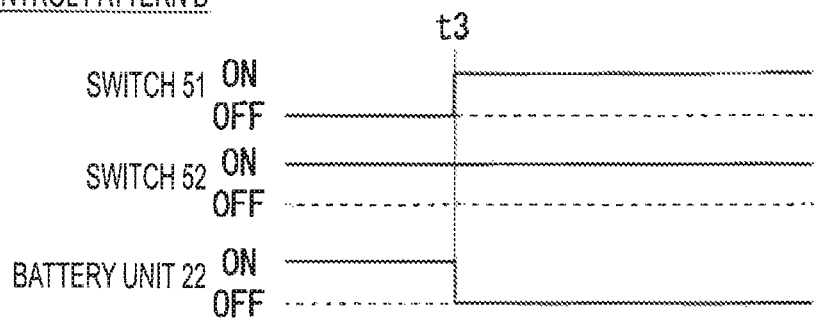
FIG. 12 is a diagram schematically showing an example of a timing chart.
Figure 13:
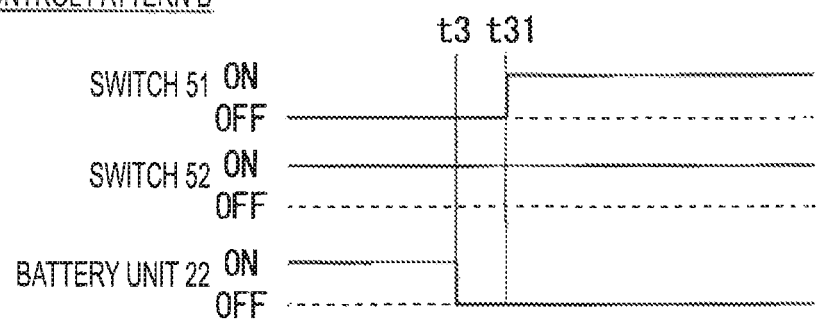
FIG. 13 is a diagram schematically showing an example of a timing chart.

FIGS. 11 to 13 show examples of timing charts when a ground fault F3 has occurred in the power supply line 62c. In FIG. 11, the control pattern A is initially used. At time t3, in response to the occurrence of a ground fault F3 in the power supply line 62c, the control circuit 9 makes the battery unit 22 non-conductive. The power storage device 1 can thereby supply power to the loads 81 to 84.

In FIG. 12, the control pattern B is initially used. In the timing chart shown in FIG. 12, at time t3, in response to the occurrence of a ground fault F3 in the power supply line 62c, the control circuit 9 turns on the switch 51, and makes the battery unit 22 non-conductive. The power storage device 1 can thereby supply power to the loads 81 to 84.

However, it is difficult for the control circuit 9 to simultaneously control the switch 51 and the battery unit 22. For this reason, turning on the switch 51 and making the battery unit 22 non-conductive may be performed in a predetermined order. The predetermined order may be set arbitrarily. However, as shown in the timing chart of FIG. 13, the control circuit 9 may make the battery unit 22 non-conductive at time t3, and thereafter turn on the switch 51 at time t31. By doing so, the advantageous effects described below can be obtained.

For comparison, a case will be considered in which the switch 51 is turned on before the battery unit 22 is made non-conductive. In this case, a ground fault current may flow from the power storage device 1 during a period from when the switch 51 is turned on to when the battery unit 22 is made non-conductive. The ground fault current does not contribute to the operation of the loads 81 to 84. Accordingly, unnecessary power consumption occurs.

If, on the other hand, the battery unit 22 is made non-conductive before the switch 51 is turned on, the power storage device 1 has already been separated from the power supply line 62c at the time (time t31) when the switch 51 is turned on. Accordingly, a ground fault current from the power storage device 1 does not occur even when the switch 51 is turned on. Accordingly, it is possible to avoid unnecessary power consumption.

Figure 14:
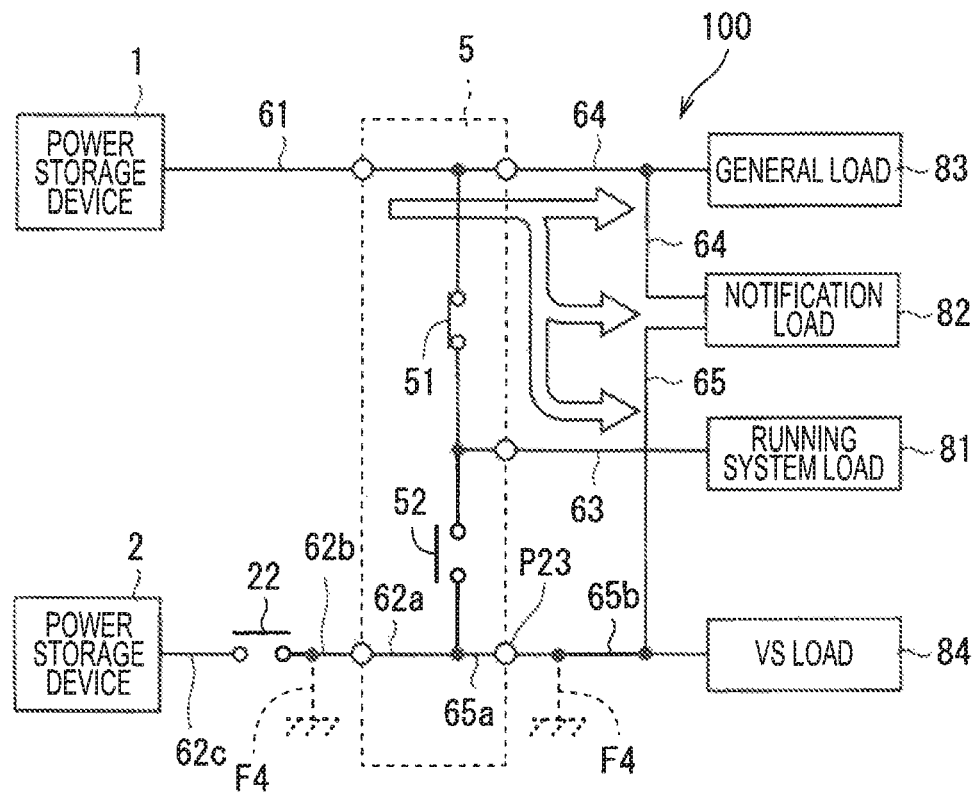
FIG. 14 is a diagram schematically showing an example of the on-board power supply system when a ground fault has occurred.

FIG. 14 is a diagram schematically showing an example of the on-board power supply system 100 when a ground fault F4 has occurred in either of the power supply lines 62b and 65b. In a state in which a ground fault F4 has occurred in the power supply line 62b or the power supply line 65b, when the battery unit 22 is conductive, a ground fault current flows from the power storage device 2 to the ground fault F4. In this case, the power storage device 2 cannot appropriately supply power to the loads 81 to 84. Likewise, when both the switches 51 and 52 are on, a ground fault current flows from the power storage device 1 to the ground fault F4. In this case, the power storage device 1 as well cannot appropriately supply power to the loads 81 to 84.

The same applies to the case where a ground fault F4 has occurred in the conductive path 62a or 65a. The ground fault F4 can be explained as follows. That is, the ground fault F4 is a ground fault that occurs on the power storage device 2 side or the output terminal P23 side with respect to the switch 52 (excluding the ground fault F3).

If it is determined that a ground fault F4 has occurred in any of the conductive paths 62a and 65a, the power supply line 62b, and the power supply line 65b, the control circuit 9 turns on the switch 51, and turns off the switch 52.

The power storage device 1 can thereby supply power to the loads 81 to 83. In the example shown in FIG. 14, the power supply paths are indicated by block arrows. Also, in the example shown in FIG. 14, the battery unit 22 is non-conductive. Accordingly, the ground fault current that flows from the power storage device 2 can be blocked.

Figure 15:
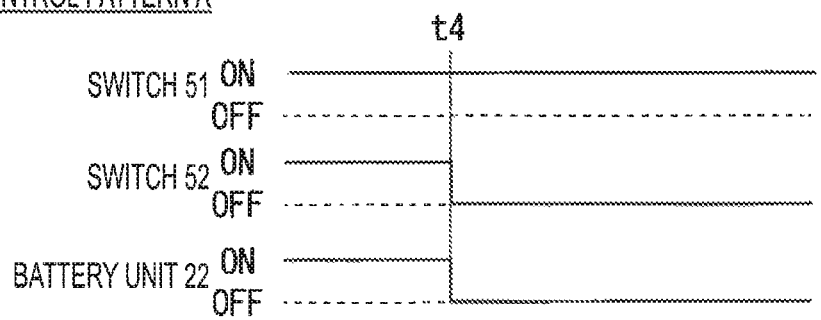
FIG. 15 is a diagram schematically showing an example of a timing chart.
Figure 16:
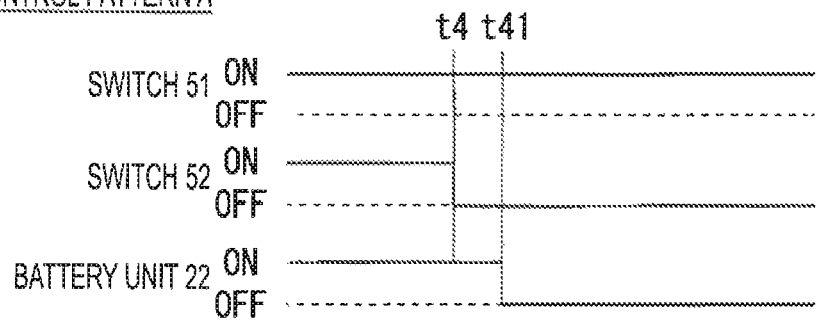
FIG. 16 is a diagram schematically showing an example of a timing chart.

FIGS. 15 to 18 show examples of timing charts when a ground fault F4 has occurred in the conductive path 62a or 65a, the power supply line 62b, or the power supply line 65b. In FIG. 15, the control pattern A is initially used. In the timing chart shown in FIG. 15, at time t4, in response to the occurrence of a ground fault F4, the control circuit 9 turns off the switch 52, and makes the battery unit 22 non-conductive. As a result of the switch 52 being turned off, the power storage device 1 can supply power to the loads 81, 82, and 83.

However, it is difficult for the control circuit 9 to simultaneously control the switch 52 and the battery unit 22. For this reason, turning off the switch 52 and making the battery unit 22 non-conductive may be performed in a predetermined order. The predetermined order may be set arbitrarily. However, as shown in the timing chart in FIG. 16, the control circuit 9 may make the battery unit 22 non-conductive at time t41 that is after the switch 52 has been turned off. By doing so, power can be supplied to the load 81 more rapidly compared to the case where the switch 52 is turned off after the battery unit 22 has been made non-conductive.

Figure 17:
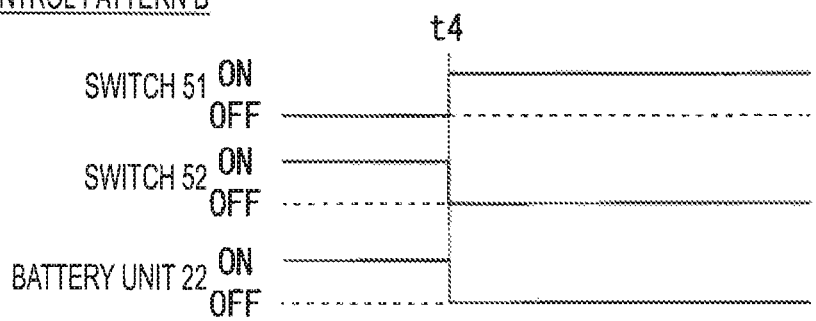
FIG. 17 is a diagram schematically showing an example of a timing chart.
Figure 18:
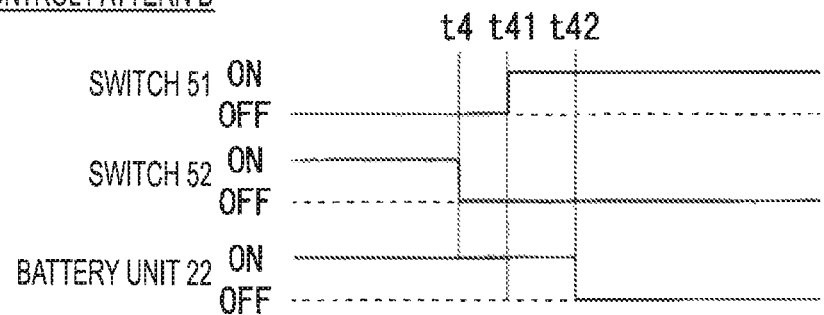
FIG. 18 is a diagram schematically showing an example of a timing chart.

In FIG. 17, the control pattern B is initially used. As shown in the timing chart of FIG. 17, at time t4, in response to the occurrence of a ground fault F4, the control circuit 9 turns on the switch 51, turns off the switch 52, and makes the battery unit 22 non-conductive. The power storage device 1 can thereby supply power to the loads 81, 82, and 83.

However, it is difficult for the control circuit 9 to simultaneously control the switches 51 and 52, and the battery unit 22. For this reason, turning on the switch 51, turning off the switch 52, and making the battery unit 22 non-conductive may be performed in a predetermined order. The predetermined order may be set arbitrarily. However, as shown in the timing chart of FIG. 18, the control circuit 9 may turn off the switch 52 at time t4, then turn on the switch 51 at time t41, and thereafter make the battery unit 22 non-conductive at time t42.

For comparison, a case will be considered in which the switch 51 is turned on before the switch 52 is turned off, and thereafter the battery unit 22 is made non-conductive. In this case, a ground fault current may flow from the power storage device 1 to the ground fault F4 during a period from when the switch 51 is turned on to when the switch 52 is turned off. The ground fault current does not contribute to the operation of the loads 81 to 84. Accordingly, unnecessary power consumption occurs.

If, on the other hand, the switch 52 is turned off before the switch 51 is turned on, it is possible to avoid the ground fault current from the power storage device 1. Accordingly, unnecessary power consumption occurs can be avoided.

It is desirable that the battery unit 22 is made non-conductive after the switches 51 and 52 have been switched. This is because the non-conductive state of the battery unit 22 does not contribute to the power supply from the power storage device 1 to the loads 81 to 83.

Variations

Figure 19:
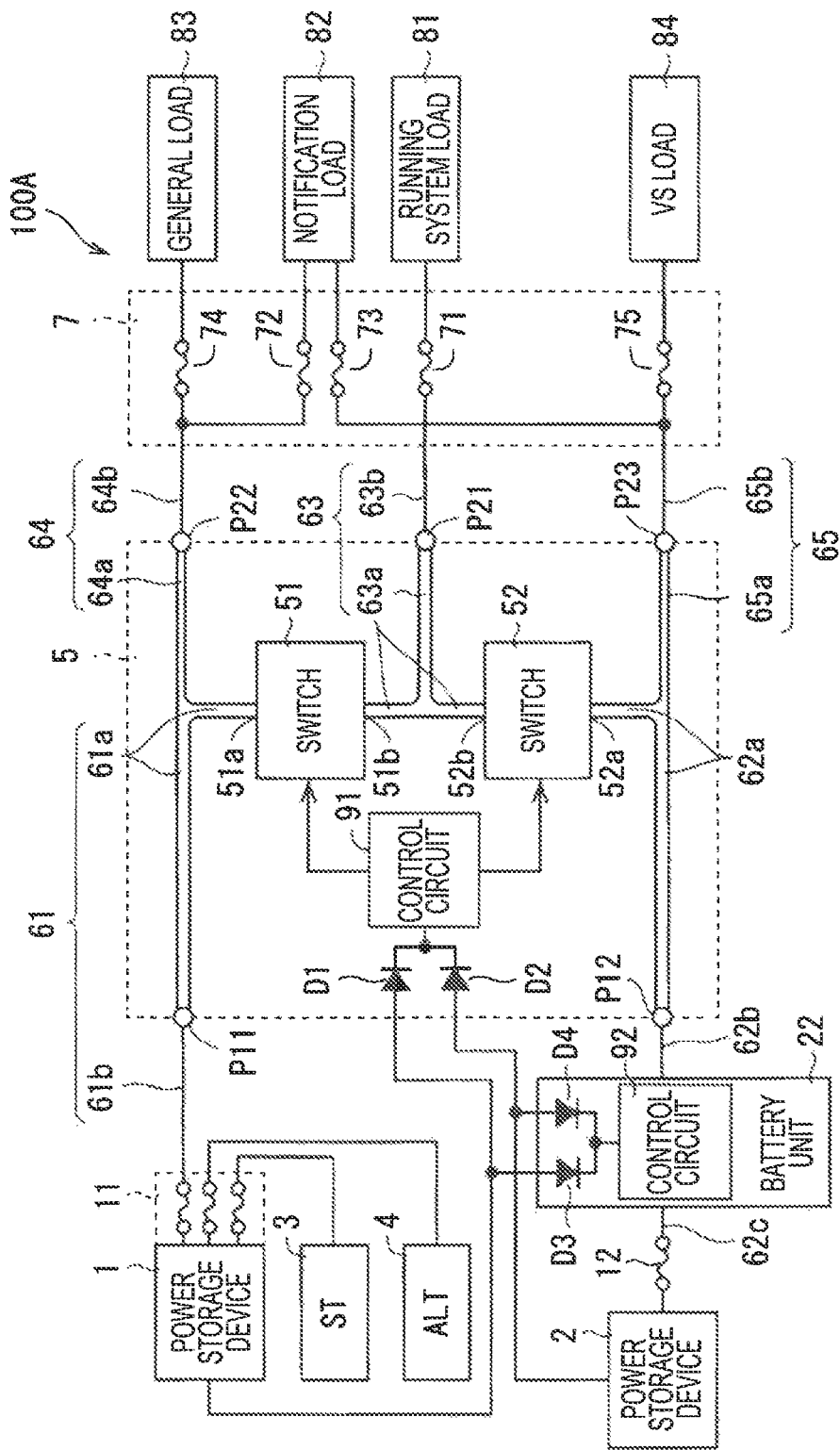
FIG. 19 is a diagram schematically showing an example of an on-board power supply system.

FIG. 19 is a diagram schematically showing an example of a configuration of an on-board power supply system 100A according to a variation. The on-board power supply system 100A is different from the on-board power supply system 100 in that the control circuit is different. In the on-board power supply system 100A, a control circuit 91 is incorporated in the switch device 5. The control circuit 91 controls the switches 51 and 52. As with the control circuit 9, the control circuit 91 receives power from the power storage devices 1 and 2 via the diodes D1 and D2. As shown in FIG. 19, the diodes D1 and D2 may belong to the switch device 5.

Also, in the on-board power supply system 100A, a control circuit 92 is incorporated in the battery unit 22. The control circuit 92 controls the battery unit 22 (that is a switch or a DC/DC converter). In the example shown in FIG. 19, diodes D3 and D4 are provided, and as with the control circuit 9, the control circuit 92 receives power from the power storage devices 1 and 2 via the diodes D3 and D4. As shown in FIG. 19, the diodes D3 and D4 may belong to the battery unit 22.

Figure 20:
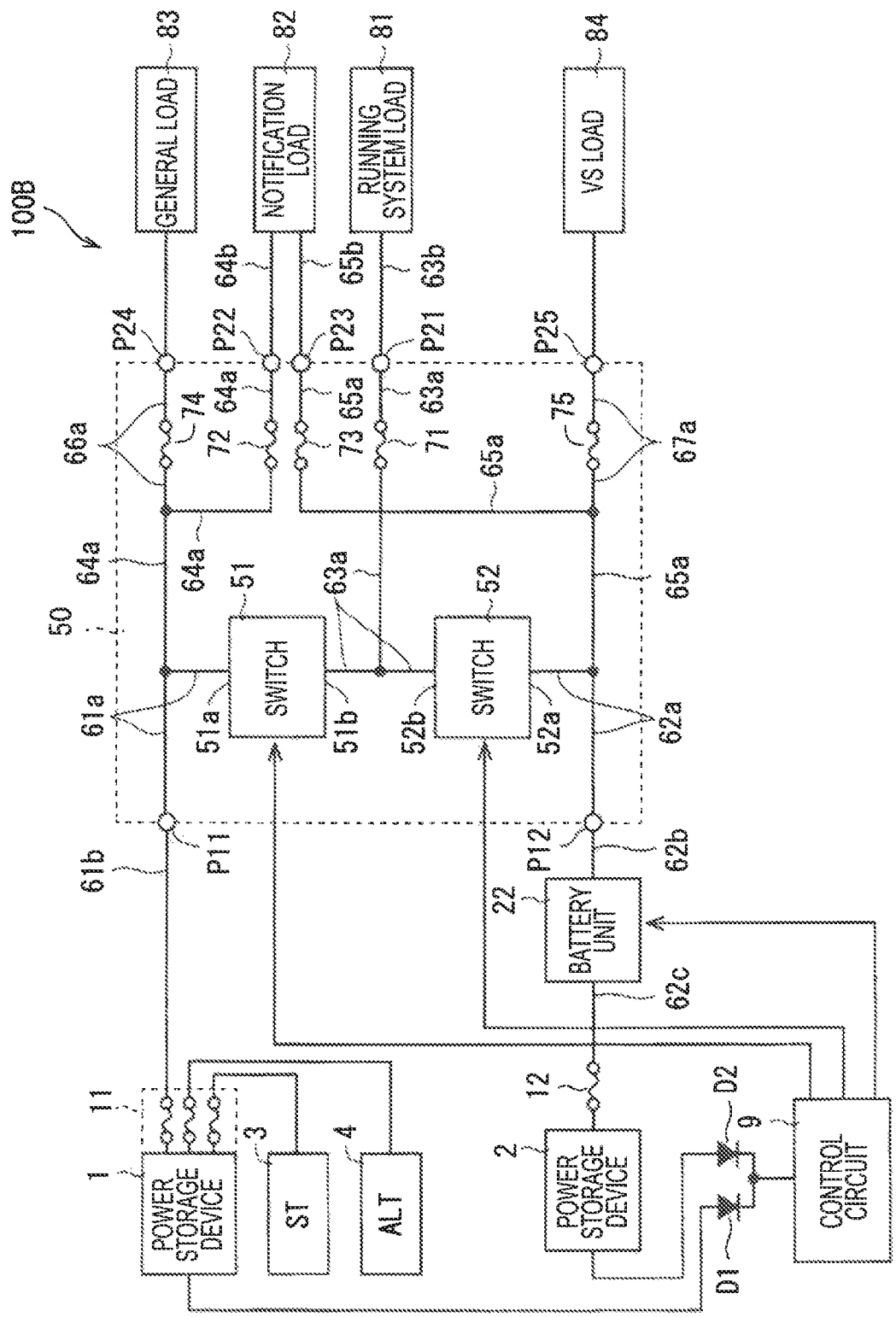
FIG. 20 is a diagram schematically showing an example of an on-board power supply system.

FIG. 20 is a diagram schematically showing an example of a configuration of an on-board power supply system 100B. The on-board power supply system 100B is different from the on-board power supply system 100 in that the switch device 5 and the fuse box 7 are configured as a single unit. In the on-board power supply system 100B, a switch device 50 is provided instead of the switch device 5, and the switch device 50 includes fuses 71 to 75. Also, the switch device 50 further includes conductive paths 66a and 67a, and output terminals P24 and P25.

The fuse 71 is connected on the conductive path 63a at a position between the output terminal P21 and a connection point at which the switches 51 and 52 are mutually connected. The fuse 72 is connected on the conductive path 64a, and the fuse 73 is connected on the conductive path 65a.

The conductive path 66a is branched from the conductive path 64a, and connected to the output terminal P24. The output terminal P24 is connected to the load 83 via a wire. The fuse 74 is connected on the conductive path 66a. The conductive path 67a is branched from the conductive path 65a, and connected to the output terminal P25. The output terminal P25 is connected to the load 84 via a wire.

Figure 21:
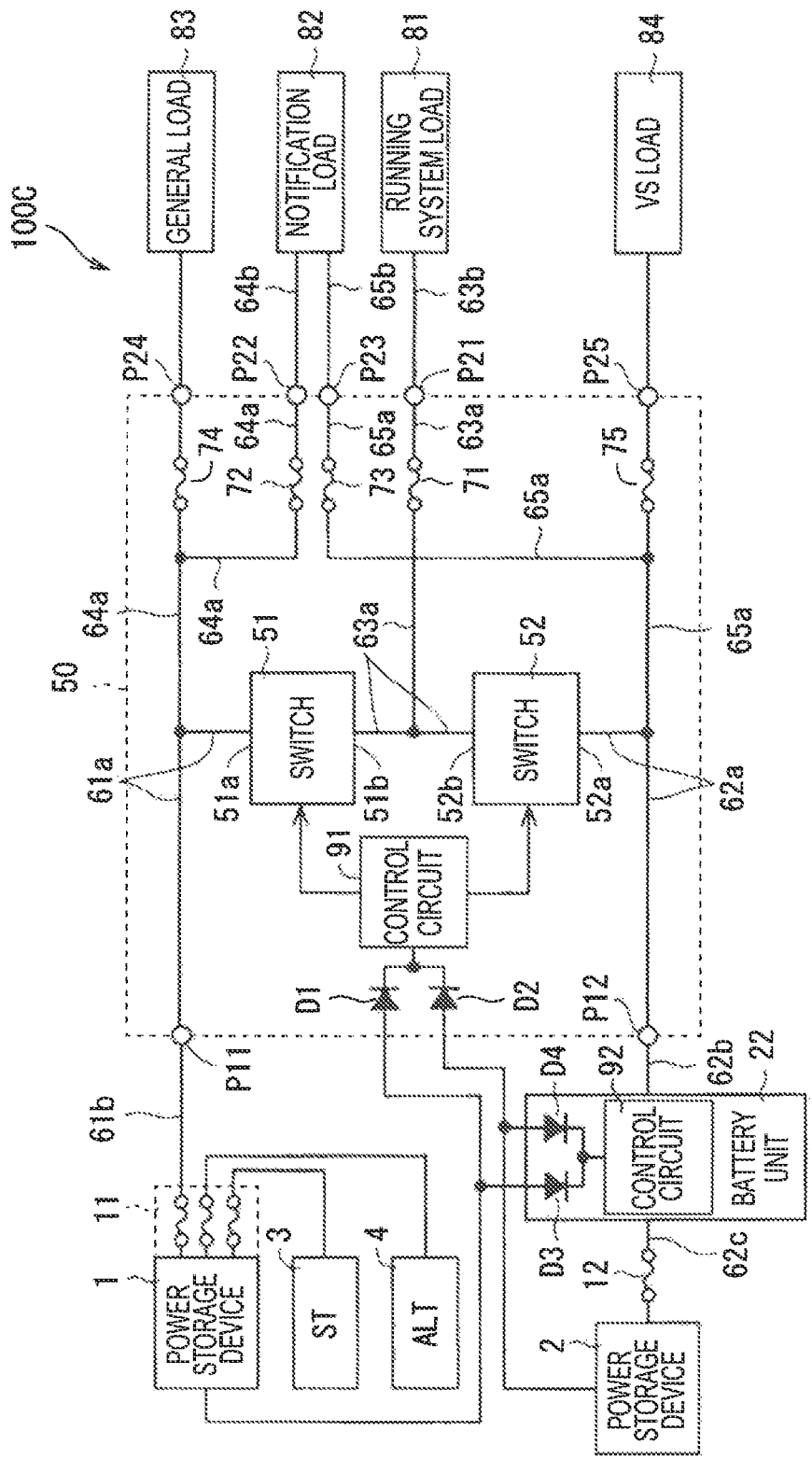
FIG. 21 is a diagram schematically showing an example of an on-board power supply system.

FIG. 21 is a diagram showing an example of a configuration of an on-board power supply system 100C. The on-board power supply system 100C is different from the on-board power supply system 100B in that the control circuit is different. In the on-board power supply system 100C, control circuits 91 and 92, and diodes D3 and D4 are provided as in the on-board power supply system 100A.

The configurations described in the embodiments and the variations above can be combined as appropriate unless there is no mutual contradiction.

The present disclosure has been described in detail above. However, the description given above is merely examples in all aspects, and thus the present disclosure is not limited thereto. It is understood that an infinite number of variations that are not described herein are also encompassed within the scope of the present disclosure without departing from the scope of the present disclosure. For example, the current capacities of the conductive paths 63a to 65a of the switch device 5 may be equal. Alternatively, the current capacities of the conductive paths 64a and 65a may be larger than the current capacity of the conductive path 63a. This is because when the current capacity of the power supply line 63b is set to be smaller than the current capacities of the power supply lines 64b and 65b, the current capacity of the wire 63 will be smaller than the current capacities of the wires 64 and 65. In this case as well, the power supply lines 63b to 65b can be easily routed.

The invention claimed is:

1. A switch device for an on-board power supply, the switch device comprising:
a first input terminal that is connected to a first battery;
a second input terminal that is connected to a second battery;
a first output terminal that is connected to a first load;
a second output terminal and a third output terminal that are both connected to a second load;
a first conductive path that is connected to the first input terminal;
a first switch that includes one terminal that is connected to the first input terminal via the first conductive path, and further includes another terminal;
a second conductive path that is connected to the second input terminal;
a second switch that includes one terminal that is connected to the second input terminal via the second conductive path, and further includes another terminal;
a third conductive path that connects the other terminal of the first switch, the other terminal of the second switch, and the first output terminal to each other;
a fourth conductive path that connects the first conductive path and the second output terminal, and has a current capacity that is smaller than a current capacity of the third conductive path; and a fifth conductive path that connects the second conductive path and the third output terminal, and has a current capacity that is smaller than the current capacity of the third conductive path.

2. The switch device for an on-board power supply according to claim 1,
wherein a lead battery is connected to the first input terminal as the first battery,
a lithium ion battery or a nickel-metal hydride battery is connected to the second input terminal as the second battery,
the first switch and the second switch are controlled by a control circuit, and
the control circuit turns off the second switch, and thereafter turns off the first switch if it is determined that a ground fault has occurred on a first output terminal side with respect to the first switch and the second switch while the first switch and the second switch are on.

3. The switch device for an on-board power supply according to claim 2, further comprising the control circuit.

4. The switch device for an on-board power supply according to claim 1,
wherein the first switch and the second switch are controlled by a control circuit, and
the control circuit turns off the second switch, and thereafter turns on the first switch if it is determined that a ground fault has occurred on a second battery side or a third output terminal side with respect to the second switch while the first switch is off, and the second switch is on.

5. The switch device for an on-board power supply according to claim 1,
wherein the second battery is connected to the second input terminal via a battery unit,
the battery unit performs switching between a conductive state and a non-conductive state between the second battery and the second input terminal,
the first switch, the second switch, and the battery unit are controlled by a control circuit, and
the control circuit makes the battery unit non-conductive, and thereafter turns on the first switch if it is determined that a ground fault has occurred on a second battery side with respect to the battery unit while the first switch is off, the second switch is on, and the battery unit is conductive.

6. The switch device for an on-board power supply according to claim 1,
wherein the second battery is connected to the second input terminal via a battery unit,
the battery unit performs switching between a conductive state and a non-conductive state between the second battery and the second input terminal,
the first switch, the second switch, and the battery unit are controlled by a control circuit, and
the control circuit turns on the first switch and turns off the second switch, and thereafter makes the battery unit non-conductive if it is determined that a ground fault has occurred on a second switch side or a third output terminal side with respect to the battery unit.

\* \* \* \* \*